United States Patent [19]

Toyoda et al.

[11] 4,340,639
[45] Jul. 20, 1982

[54] SYNTHETIC PAPER COMPRISING AN OLEFIN-BASED RESIN AND AN ADDUCT

[75] Inventors: Takashi Toyoda; Yozo Ohba; Masaaki Yamanaka, all of Ibaraki, Japan

[73] Assignee: Oji Yuka Goseishi Co., Ltd., Tokyo, Japan

[21] Appl. No.: 172,481

[22] Filed: Jul. 25, 1980

[30] Foreign Application Priority Data

Jul. 25, 1979 [JP] Japan .................................. 54-94783

[51] Int. Cl.$^3$ ....................... B32B 27/00; B32B 27/06
[52] U.S. Cl. ................................ 428/338; 428/422.8; 428/508; 428/516; 428/520; 428/910; 544/192; 544/197
[58] Field of Search ............... 428/523, 516, 910, 520, 428/338, 921, 147, 422.8, 144, 153, 508; 544/192, 197

[56] References Cited

U.S. PATENT DOCUMENTS

| | | | |
|---|---|---|---|
| 2,994,672 | 8/1961 | Geerdes | 428/508 X |
| 3,290,307 | 12/1966 | Keller et al. | 544/197 X |
| 3,312,698 | 4/1967 | Dazzi et al. | 544/197 |
| 3,551,538 | 12/1970 | Yamamoto et al. | 428/147 X |
| 3,922,427 | 11/1975 | Toyoda et al. | 428/910 X |
| 4,180,614 | 12/1979 | Angelo et al. | 428/910 X |
| 4,242,396 | 12/1980 | Wilson et al. | 428/910 X |

*Primary Examiner*—P. Ives
*Attorney, Agent, or Firm*—Sughrue, Mion, Zinn, Macpeak & Seas

[57] ABSTRACT

A synthetic paper prepared by stretching a sheet of a composition comprising a thermoplastic resin mainly composed of an olefin-based resin and an adduct of melamine and isocyanuric acid or cyanuric acid to a size of 1.3 times or more the original size of the sheet at a temperature lower than the melting temperature of the olefin-based resin; such synthetic paper has good luster and sliding properties.

11 Claims, No Drawings

SYNTHETIC PAPER COMPRISING AN OLEFIN-BASED RESIN AND AN ADDUCT

BACKGROUND OF THE INVENTION

1. Field of the Invention

This invention relates to synthetic papers and more particularly to synthetic papers on which letters, pictures, etc., can be printed by offset printing, photogravure printing, etc., or can be written upon with a pencil, a fountain pen, etc., and which have excellent luster and sliding properties.

Such synthetic paper can be utilized as highclass makeup paper, art paper, paper patterns for dresses, paper for a poster, and so forth. Moreover, it can be used as a large-sized stretch wrapping film for which sliding properties are required, a substrate on which a sticker or an adhesive label is provided and for which stripping properties are required, and a white board on which letters, etc., can be written with chalk, marking pen using peelable ink, aqueous ink pen or oily ink pen.

2. Description of the Prior Art

As is known in the art, a composition comprising a film-forming thermoplastic resin, an inorganic filler, e.g., talc, clay, diatomaceous earth, titanium oxide, etc., a thermosetting resin powder or a thermoplastic resin which is not compatible with a film-forming thermoplastic resin can be processed to form a sheet (also referred to as a film), and the sheet thus-formed is stretched at a temperature lower than the melting temperature of the matrix resin of the film or sheet monoaxially or in a plurality of directions, to thereby produce a film or synthetic paper having a matt-finished surface on which letters, etc., can be written by a writing means or by printing. See, for example, U.S. Pat. Nos. 3,154,461, 3,515,626, and 3,814,193. See also British Pat. No. 1,096,064.

The matt-finish of the surface of the film formed by the stretching, however, suffers from the disadvantage that it results in adverse influences on sliding and stripping properties, although it improves printing and writing properties. That is, where such prior art synthetic paper is used as a large-sized stretch wrapping film which is employed, e.g., to wrap grain bags mounted on a pallette together with the pallette or as a substrate on which a sticker is provided, such matt-finish is not preferred, in view of the following considerations:

(1) Where used in large-sized stretch wrapping, it is subjected to high tension and, therefore, when the wound film is removed from a group of rolls, it produces an unpleasant sound, and also reduces workability because of the lack of the sliding properties.

(2) In order to improve the stripping properties, it is necessary to coat wax or a silicon resin on the matt-finished surface.

SUMMARY OF THE INVENTION

It has now been found according to this invention that an adduct of melamine and isocyanuric acid or cyanuric acid is white, functions as a lubricant, and that the use of such an adduct enables production of a film or sheet having good printing and writing properties without using inorganic fillers.

This invention, therefore, provides a synthetic paper obtained by stretching a film or sheet of a composition comprising a thermoplastic resin, composed mainly (that is, more than 50%) of an olefin-based resin, and an adduct of melamine and isocyanuric acid or an adduct of melamine and cyanuric acid (that is, adducts of either or both of isocyanuric and cyanuric acids), wherein said adduct is present in an amount of from 0.5 to 200 parts by weight per 100 parts by weight of the thermoplastic resin, said stretching being to a size of 1.3 times or more the original size (that is, the size in each dimension in which the sheet is stretched) of the sheet, in at least one direction at a temperature lower than the melting temperature of the olefin-based resin.

DETAILED DESCRIPTION OF THE INVENTION

The adduct of melamine and isocyanuric acid or cyanuric acid (hereinafter referred to simply as "a melamine-isocyanuric acid adduct") is obtained by mixing an aqueous solution of melamine and an aqueous solution of isocyanuric acid or its tautomer, cyanuric acid, and depositing the adduct formed as a white precipitate.

Isocyanuric acid (S-Triazine-1,3,5-trihydrogen-2,4,6-trione) corresponds to a keto form structure of cyanuric acid (S-Triazine-2,4,6-triol), and these are limiting structures of the tautomerism.

It is reported in various articles such as *Chem. Abstracts*, Vol. 47, 10373C (1951) and *Chem. Abstracts*, Vol. 45, 4137 (1951) that the powder and the aqueous solution having a pH of 0.6 or less are essentially completely in the tri-keto form (isocyanuric acid), whereas an aqueous solution having a pH of from 6 to 10.5 is mainly in the di-keto form, aqueous solutions having a pH of 11 or more are in the mono-keto form, and the strongly basic aqueous solution is predominantly in the tri-enol form (cyanuric acid).

This adduct is a white powder having a sublimation temperature of about 440° C., measured by differential thermal analysis, and has an average particle diameter of from about 0.01 to 10 microns, preferably from about 0.01 to 5 microns. In the case that the thickness of the sheet is about 1 to 3 microns, the adduct having an average diameter of 10 microns tends to fall off from the sheet, which causes the source of powder trouble.

Olefin-based resins which can be used as the matrix component of the film include a homopolymer of olefins having 2 to 4 carbon atoms, a copolymer of at least two of the olefins having 2 to 4 carbon atoms, a copolymer of the olefins having 2 to 4 carbon atoms and α-olefins having 5 to 10 carbon atoms and a homopolymer of styrene. The representative examples thereof are polystyrene, polypropylene and polyethylene. Polypropylene and polyethylene having a density of 0.940 to 0.970 g/cm$^3$ are preferred from the viewpoint of strength and chemical resistance.

The olefin-based resins can be used singly or in combinations thereof. Furthermore, if desired, other stretchable thermoplastic resins, such as polyamide, polyethylene terephthalate, etc., and rubber substances such as a styrene-butadiene rubber, an ethylene-propylene rubber, etc., may be compounded therewith in an amount of less than 50% by weight.

The melamine-isocyanuric acid adduct is added in an amount of from 0.5 to 200 parts by weight, and preferably from 5 to 50 parts by weight, per 100 parts by weight of the thermoplastic resin, which is mainly composed of the olefin-based resin. In amounts less than 0.5 parts by weight, the sliding and printing properties are insufficient. On the other hand, in amounts greater than 200 parts by weight, secondary aggregation of the adduct tends to occur, causing the formation of graininess which is not desirable from the viewpoint of printing. Furthermore, it is preferred that the melamine-isocyanuric acid adduct be added in an amount of from 5 parts by weight (to make the sheet opaque) up to 25 parts by weight (for smoothness) per 100 parts by weight of thermoplastic resin.

The thus-prepared composition is melted, kneaded, extruded from a die, and then cooled to form a film or sheet. The film or sheet so formed is stretched at a temperature which is lower than the melting point of the olefin-based resin, preferably lower by at least 5° C. than the melting point of the olefin-based resin. Where the olefin-based resin is a homopolymer of propylene (M.P. 164°–167° C.), it is suitably from 140° C. to 162° C. In the case of polystyrene, it is suitably from 120° C. to 150° C. and in the case of polyethylene (M.P. 124°–136° C.) having a density of 0.940 to 0.970 g/cm$^3$, it is suitably from 120° C. to 133° C.

Where the olefin-based resin is a mixture of, e.g., polypropylene and high density polyethylene, or a mixture of high density polyethylene and low density polyethylene, the film or sheet is stretched at a temperature lower than the melting temperature of at least one of the olefin-based resins, preferably at a temperature lower than the melting point of the olefin resin constituting the matrix thereof.

Furthermore, depending upon the capabilities required, inorganic fillers such as calcium carbonate, calcined clay, titanium oxide, talc, diatomaceous earth, etc., may be used in combination with the melamine-isocyanuric acid adduct. The concentration range of inorganic fillers is about 0.3 to 50 wt%, preferably about 0.5 to 25 wt%, based on the weight of the total composition.

To the composition comprising the olefin-based resin and the melamine-isocyanuric acid adduct, there may further be added, if desired, a thermal stabilizer, an antioxidant, an antistatic agent, a surfactant, an ultraviolet absorber, a dispersing agent, and so forth. In particular, where the amount of the melamine-isocyanuric acid adduct added exceeds 25 parts by weight per 100 parts by weight of the thermoplastic resin, it is preferred to compound therewith a maleic anhydride-grafted polypropylene or polyethylene, wherein maleic anhydride is grafted in a ratio of from 0.01 to 5% by weight, so that the grafted polypropylene or polyethylene constituents at least 3% by weight, in order to reduce the problem of paper powder caused during printing. The "paper powder" means the phenomenon that the powders such as adduct or inorganic fillers fall off from the surface of the synthetic paper and contaminate into the printing ink, and as a result, the viscosity of the printing ink increases and the printing becomes impossible.

A film according to the invention, formed, e.g., by inflation molding or T-die molding is uniaxially or biaxially stretched, by use, e.g., of a difference in circumferential speed of a roll, a tentor, etc., to a size of at least 1.3 times, and preferably from 2.5 to 10 times its original longitudinal and/or transverse direction. When stretching in multiple directions, the stretchings may be done at the same time or sequentially. Thus the stretched area can be from about 5 to 50 times the original area when biaxially stretched. The opaqueness of the synthetic paper obtained generally increases as the stretching ratio is increased.

Furthermore, as the stretching temperature is lowered, the opaqueness also increases. In some cases, the stretching produces voids in the interior of the film, further increasing the degree of opaqueness.

Therefore, the stretching temperatures and stretching ratios are suitably determined depending upon the capabilities required for the synthetic paper.

The thus-obtained synthetic paper may be subjected to further treatments, such as a surface corona discharge treatment, a surface coating treatment, and so forth.

The synthetic paper of this invention has good low friction properties and luster since it contains the melamine-isocyanuric acid adduct as a filler. Furthermore, in comparison with cases wherein only conventional inorganic and organic fillers are used, the problem of paper powder in printing occurs to some extent. Moreover, the synthetic paper of this invention has the advantage that when it is printed by offset printing (in which the ink from a printing plate of aluminum or the like is received on a rubber-covered blanket, from which it is transferred to the synthetic paper), abrasion loss of the printing plate due to paper powder and pressed cylinders is reduced in comparison with conventional synthetic papers.

The following examples are given to illustrate this invention in greater detail. All parts and percentages are by weight.

EXAMPLE 1

A composition consisting of 90 parts of polypropylene (trade name—"Mitsubishi Noblen MA-6"; produced by Mitsubishi Petrochemical Co., Ltd.) (m.p. 164° C.), 10 parts of high density polyethylene (trademark—"Yukalon Hard ER-40") (m.p. 134° C.), and 10 parts of calcined clay was melted and kneaded in an extruder, and then extruded from a die in a sheet-form at a temperature of 200° C. The sheet thus-obtained was then cooled to about 50° C.

Thereafter the sheet was heated to about 135° C., and stretched to 5 times the original size in a longitudinal direction by utilizing the difference in circumferential speeds of rolls.

A mixture of 86 parts of polypropylene (trade name—"Mitsubishi Noblen MA-3") (m.p. 163° C.) and 14 parts of a melamine-isocyanuric acid adduct having a grain diameter of from 0.1 to 1μ was melted and kneaded in two extruders, from which two sheet-like materials were separately extruded through the respective dies thereof at a temperature of 200° C., and laminated on both sides of the above-described longitudinally stretched sheet.

The thus-laminated sheet was cooled to a temperature which was higher by 20° C. than room temperature, then heated up to about 150° C., stretched to 8 times the original size in a crosswise direction by use of a tentor and heat-set while passing the sheet through an oven maintained at 160° C. There was thus obtained a synthetic paper having a three layer construction such that the intermediate layer of the biaxially stretched film was 50μ thick and the monoaxially stretched film provided on each side of the intermediate layer was 25μ thick.

EXAMPLE 2

In the same manner as in Example 1, except that a composition consisting of 72 parts of polypropylene and 28 parts of a melamine-isocyanuric acid adduct was used to form the layers to be provided on both sides of the intermediate layer, a synthetic paper of the same three layer construction as in Example 1 was prepared.

COMPARATIVE EXAMPLE 1

A synthetic paper of three layer construction was produced in the same manner as in Example 2 except that calcined clay (average particle diameter 1.5 microns) was used in place of the melamine-isocyanuric acid adduct.

The synthetic papers obtained in Examples 1 and 2 and Comparative Example 1 were evaluated by the following methods. The results are shown in Table 1.

Offset Printing Properties (1) Paper Powder

Number of sheets which can be printed until the problem of paper powder occurs when continuously printed.

(2) Transferability of Ink

A sharp print is indicated with the symbol (o).

Smoothness

Measured according to JIS P-8119 (1976).

Luster

Gross, measured according to JIS Z-8741 (1962), 75°.

Stripping Properties

A 15 mm wide and 200 mm long test piece is cut from the synthetic paper. On one side of this test piece, an adhesive tape (e.g., produced by Nichiban Co., Ltd.) is attached, and then stripped at an angle of 90°. When the force required for the stripping is small, the stripping properties are good, which is indicated by the symbol (o) whereas when it is large, the stripping properties are not good, which is indicated by the symbol (x).

Static Coefficient of Friction

Measured according to ASTM D 1894-73.

Writing Properties

When it is possible to write with a pencil (HB grade, e.g., produced by Mitsubishi Pencil Co., Ltd.), the writing properties are good, which is indicated by the symbol (o).

TABLE 1

|  | Example 1 | Example 2 | Comparative Example 1 |
|---|---|---|---|
| Printing Properties |  |  |  |
| Paper Powder | more than 10,000 | 8,000 | 500 |
| Transferability of Ink | o | o | o |
| Smoothness (sec) | 1,850 | 900 | 600 |
| Luster (%) | 57 | 42 | 18 |
| Stripping Properties | o | o | x |
| Static Coefficient of Friction | 0.16 | 0.17 | 0.22 |
| Writing Properties | o | o | o |

EXAMPLE 3

A composition consisting of 65 parts of propylene (again "Mitsubishi Noblen MA-6"), 7 parts of maleic anhydride grafted polypropylene (% of maleic anhydride grafted was 0.65%), and 28 parts of a melamine-isocyanuric acid adduct was melted and kneaded in an extruder, extruded through a die in a sheet-form at a temperature of 200° C., and stretched to 5 times its original size in the longitudinal direction at 133° C., and to 8 times its original size in the crosswise direction at 150° C., to obtain a single layer biaxially stretched synthetic paper having a thickness of 100μ. The smoothness, luster, writing properties and stripping properties of this synthetic paper were then measured, and the results are shown in Table 2.

EXAMPLE 4

A composition consisting of 80 parts of high density polyethylene (m.p. 134° C.) having a density of 0.960 g/cm$^3$ and 20 parts of a melamine-isocyanuric acid adduct was melted and kneaded in an extruder, extruded through a die in a sheet-form at a temperature of 190° C., stretched to 3.5 times its original size in the longitudinal direction at 120° C., and to 7 times its original size in the crosswise direction at 130° C., to obtain a single layer biaxially stretched synthetic layer having a thickness of 100μ. The smoothness, luster, writing properties and stripping properties of this synthetic paper were also measured, and the results are shown in Table 2.

TABLE 2

|  | Example 3 | Example 4 |
|---|---|---|
| Smoothness (sec) | 1,800 | 1,700 |
| Luster (%) | 63 | 60 |
| Stripping Properties | o | o |
| Writing Properties | o | o |

While the invention has been described in detail and with reference to specific embodiments thereof, it will be apparent to one skilled in the art that various changes and modifications can be made therein without departing from the spirit and scope thereof.

What is claimed is:

1. A synthetic paper prepared by stretching a sheet of a composition comprising a thermoplastic resin, comprising an olefin-based resin, and an adduct of melamine and isocyanuric acid or cyanuric acid, wherein said adduct is present in an amount of from 0.5 to 200 parts by weight per 100 parts by weight of the thermoplastic resin, wherein said stretching is to a size of 1.3 times or more the original size of the sheet, in at least one direction at a temperature lower than the melting temperature of the olefin-based resin.

2. A synthetic paper prepared as in claim 1, wherein said adduct is present in an amount from 5 to 50 parts by weight per 100 parts by weight of a thermoplastic resin.

3. A synthetic paper prepared as in claim 1 or 2, wherein said stretching is to a size from 2.5 to 10 times the original size.

4. A synthetic paper prepared as in claim 1 or 2, wherein said stretching is to a size from 5 to 50 times the original area.

5. A synthetic paper prepared as in claim 1 or 2, wherein said stretching is biaxial stretching.

6. A synthetic paper as in claim 1 or 2, wherein said stretching is uniaxial stretching.

7. A synthetic paper prepared as in claim 3, wherein said stretching is uniaxial stretching.

8. A synthetic paper prepared as in claim 4, wherein said stretching is biaxial stretching.

9. A synthetic paper prepared as in claim 1 or 2, wherein the olefin-based resin is selected from the group of polypropylene and polyethylene having a density of from 0.940 to 0.970 g/cm$^3$.

10. A synthetic paper prepared as in claim 3, wherein the olefin-based resin is selected from the group of polypropylene and polyethylene having a density of from 0.940 to 0.970 g/cm$^3$.

11. A synthetic paper prepared as in claim 1 or 2, wherein the average particle diameter of said adduct is from about 0.1 to 10 microns.

* * * * *